US011173776B2

(12) United States Patent
Sasaki et al.

(10) Patent No.: US 11,173,776 B2
(45) Date of Patent: Nov. 16, 2021

(54) VEHICLE BODY FRONT STRUCTURE FOR ELECTRIC VEHICLE

(71) Applicant: HONDA MOTOR CO., LTD., Tokyo (JP)

(72) Inventors: Tomomi Sasaki, Wako (JP); Hiroyuki Ozawa, Wako (JP); Masakuni Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 16/386,436

(22) Filed: Apr. 17, 2019

(65) Prior Publication Data

US 2019/0322164 A1 Oct. 24, 2019

(30) Foreign Application Priority Data

Apr. 20, 2018 (JP) .............................. JP2018-081188

(51) Int. Cl.
*B60K 1/04* (2019.01)
*B62D 21/15* (2006.01)

(52) U.S. Cl.
CPC .............. *B60K 1/04* (2013.01); *B62D 21/155* (2013.01); *B60K 2001/0438* (2013.01)

(58) Field of Classification Search
CPC .... B62D 21/155; B62D 21/152; B62D 21/15; B62D 25/20; B60K 1/04; B60K 2001/0438
See application file for complete search history.

(56) References Cited

U.S. PATENT DOCUMENTS 5,501,289 A * 3/1996 Nishikawa ............. B62D 21/10
180/68.5
5,555,950 A * 9/1996 Harada .................... B60K 1/04
180/65.1
(Continued)

FOREIGN PATENT DOCUMENTS

JP 7-117725 A 5/1995
JP 2003-261061 A 9/2003
(Continued)

OTHER PUBLICATIONS

Office Action dated Sep. 4, 2019, issued in counterpart JP application No. 2018-081188, with English translation. (8 pages).

*Primary Examiner* — Frank B Vanaman
(74) *Attorney, Agent, or Firm* — Westerman, Hattori, Daniels & Adrian, LLP

(57) ABSTRACT

In a vehicle body front structure for an electric vehicle, including a battery pack mounted beneath a vehicle body floor, a bracket and a rear end part of a vehicle body frame are each inclined downward from an upper front to a rear. When viewed in a fore-and-aft direction, at least part of the bracket overlaps the rear end part. Therefore, the rear end part, moving rearward due to frontal collision, abuts against the bracket, and the frame slips and drops downward from the upper front to the lower rear along the bracket, thus preventing any decrease in crash stroke of the frame due to interference with the battery pack at the end stage of collision. Since abutment relationship with the rear end part can be adjusted merely changing angle of inclination or position of the bracket, the cost is very low.

7 Claims, 4 Drawing Sheets

(56) References Cited

U.S. PATENT DOCUMENTS

| | | | | |
|---|---|---|---|---|
| 5,605,353 | A * | 2/1997 | Moss | B62D 21/09 |
| | | | | 188/376 |
| 9,776,661 | B2 * | 10/2017 | Kaneko | B62D 21/11 |
| 2003/0066694 | A1 * | 4/2003 | Mita | B60L 50/51 |
| | | | | 180/65.1 |
| 2005/0077754 | A1 * | 4/2005 | Tomita | B62D 21/152 |
| | | | | 296/187.03 |
| 2010/0019477 | A1 * | 1/2010 | Korechika | B60R 21/02 |
| | | | | 280/748 |
| 2010/0116568 | A1 * | 5/2010 | Kadoi | B60L 3/0046 |
| | | | | 180/65.1 |
| 2011/0068606 | A1 * | 3/2011 | Klimek | B62D 21/152 |
| | | | | 296/187.08 |
| 2012/0049571 | A1 | 3/2012 | Katou et al. | |
| 2013/0119757 | A1 * | 5/2013 | Tachikawa | B60K 1/04 |
| | | | | 307/9.1 |
| 2013/0270861 | A1 | 10/2013 | Young et al. | |
| 2014/0117716 | A1 | 5/2014 | Patberg et al. | |
| 2014/0167450 | A1 * | 6/2014 | Sotoyama | B62D 21/152 |
| | | | | 296/187.09 |

FOREIGN PATENT DOCUMENTS

| | | |
|---|---|---|
| JP | 2012-45995 A | 3/2012 |
| JP | 2012-106558 A | 6/2012 |
| JP | 2013-154880 A | 8/2013 |
| JP | 2014-522774 A | 9/2014 |
| JP | 2016-052862 A | 4/2016 |
| WO | 2014/038346 A1 | 3/2014 |

* cited by examiner

VEHICLE BODY FRONT STRUCTURE FOR ELECTRIC VEHICLE

BACKGROUND OF THE INVENTION

Field of the Invention

The present invention relates to a vehicle body front structure for an electric vehicle, comprising a battery pack mounted beneath a vehicle body floor, a bracket having a rear part and a front part thereof, the rear part being fixed to the battery pack and the front part being fixed to the vehicle body floor, and a vehicle body frame disposed in a fore-and-aft direction in front of the vehicle body floor.

Description of the Related Art

Japanese Patent Application Laid-open No. 7-117725 has made known an arrangement in which a battery frame having a battery mounted thereon is attached to a lower face of a vehicle body frame and a guide face formed on an upper face of a rear part of a subframe disposed in front of the battery frame is made to oppose a slant part formed on a lower face of a front part of the battery frame, and when the vehicle is involved in a frontal collision, abutting the guide face against the slant part makes the subframe drop downward, thus avoiding any decrease in the crash stroke of the subframe due to interference with the battery frame.

In the above arrangement, since the slant part is provided directly on the front part of the battery frame, in order to finely adjust the angle or the position of the slant part, it is necessary to re-design the battery frame, which is a large member, and there is the problem that the cost increases.

SUMMARY OF THE INVENTION

The present invention has been accomplished in light of the above circumstances, and it is an object thereof to ensure with a simple structure the crash stroke of a vehicle body frame when an electric vehicle in which a battery pack is mounted beneath a vehicle body floor is involved in a frontal collision.

In order to achieve the object, according to a first aspect of the present invention, there is provided a vehicle body front structure for an electric vehicle, comprising a battery pack mounted beneath a vehicle body floor, a bracket having a rear part and a front part thereof, the rear part being fixed to the battery pack and the front part being fixed to the vehicle body floor, and a vehicle body frame disposed in a fore-and-aft direction in front of the vehicle body floor, wherein a rear end part of the vehicle body frame is inclined downward from an upper front to a rear, the bracket is inclined downward from the upper front to the rear, and when viewed in the fore-and-aft direction, at least part of the bracket overlaps the rear end part of the vehicle body frame.

In accordance with the first aspect, the vehicle body front part of the electric vehicle includes the battery pack mounted beneath the vehicle body floor, the bracket having its rear part fixed to the battery pack and its front part fixed to the vehicle body floor, and the vehicle body frame disposed in the fore-and-aft direction in front of the vehicle body floor. Since the rear end part of the vehicle body frame is inclined downward from the upper front to the rear, the bracket is inclined downward from the upper front to the rear, and when viewed in the fore-and-aft direction at least part of the bracket overlaps the rear end part of the vehicle body frame, the rear end part of the vehicle body frame, which moves rearward due to a frontal collision, abuts against the bracket, and the vehicle body frame slips and drops downward from the upper front to the lower rear along the bracket, thus preventing any decrease in the crash stroke of the vehicle body frame due to interference with the battery pack at the end stage of the collision. Moreover, since the abutment relationship with the rear end of the vehicle body frame can be adjusted merely utilizing the bracket for fixing the battery pack to the vehicle body floor and changing the angle of inclination or the position of the bracket without subjecting the battery pack itself to a change in design, the cost is very low.

According to a second aspect of the present invention, in addition to the first aspect, a center in a vehicle width direction of the rear end part of the vehicle body frame is offset outside in the vehicle width direction with respect to a center in the vehicle width direction of the bracket.

In accordance with the second aspect, since the center in the vehicle width direction of the rear end part of the vehicle body frame is offset outside in the vehicle width direction with respect to the center in the vehicle width direction of the bracket, when involved in an oblique frontal collision from the outside in the vehicle width direction, even if the vehicle body frame moves obliquely rearward and to the inside in the vehicle width direction, it is possible to reliably make the rear end part of the vehicle body frame abut against the bracket.

According to a third aspect of the present invention, in addition to the first aspect, a dimension in the vehicle width direction of the bracket is larger than a dimension in the vehicle width direction of the rear end part of the vehicle body frame.

In accordance with the third aspect, since the dimension in the vehicle width direction of the bracket is larger than the dimension in the vehicle width direction of the rear end part of the vehicle body frame, when involved in an oblique frontal collision from the outside in the vehicle width direction, even if the vehicle body frame moves obliquely rearward and to the inside in the vehicle width direction, it is possible to reliably make the rear end part of the vehicle body frame abut against the bracket.

According to a fourth aspect of the present invention, in addition to any one of the first to third aspects, there are a plurality of vehicle body frames as said vehicle body frame and a plurality of brackets as said bracket, and a high voltage terminal of the battery pack is positioned between two of the brackets that are adjacent to each other in the vehicle width direction.

In accordance with the fourth aspect, since there are the plurality of vehicle body frames and the plurality of brackets, and the high voltage terminal of the battery pack is positioned between two of the brackets, which are adjacent to each other in the vehicle width direction, the high voltage terminal of the battery pack can be protected by the two brackets positioned on opposite sides in the vehicle width direction of the high voltage terminal.

According to a fifth aspect of the present invention, in addition to any one of the first to third aspects, the front part of the bracket is fixed to the vehicle body floor by a bolt and bent rearward so that a head portion of the bolt is positioned rearwardly of an imaginary inclined line of the bracket.

In accordance with the fifth aspect, since the front part of the bracket is fixed to the vehicle body floor by the bolt, and the front part of the bracket is bent rearward so that the head portion of the bolt is positioned rearwardly of the imaginary inclined line of the bracket, the rear end part of the vehicle body frame, which moves rearward due to a frontal collision, does not interfere with the bolt fixing the front part of the bracket, and the vehicle body frame can be made to move smoothly rearward and drop reliably downward by the bracket.

Note that longitudinal frames 18 of embodiments correspond to the vehicle body frame of the present invention.

The above and other objects, characteristics and advantages of the present invention will be clear from detailed descriptions of the preferred embodiments which will be provided below while referring to the attached drawings.

DESCRIPTION OF THE PREFERRED EMBODIMENTS

In the following description reference numbers corresponding to components of exemplary embodiments are included only for ease of understanding, but the applicant's claims are not limited to the exemplary embodiments or to specific components of the exemplary embodiments.

First Embodiment

A first embodiment of the present invention is explained below by reference to FIG. 1 to FIG. 3.

Figure 1:
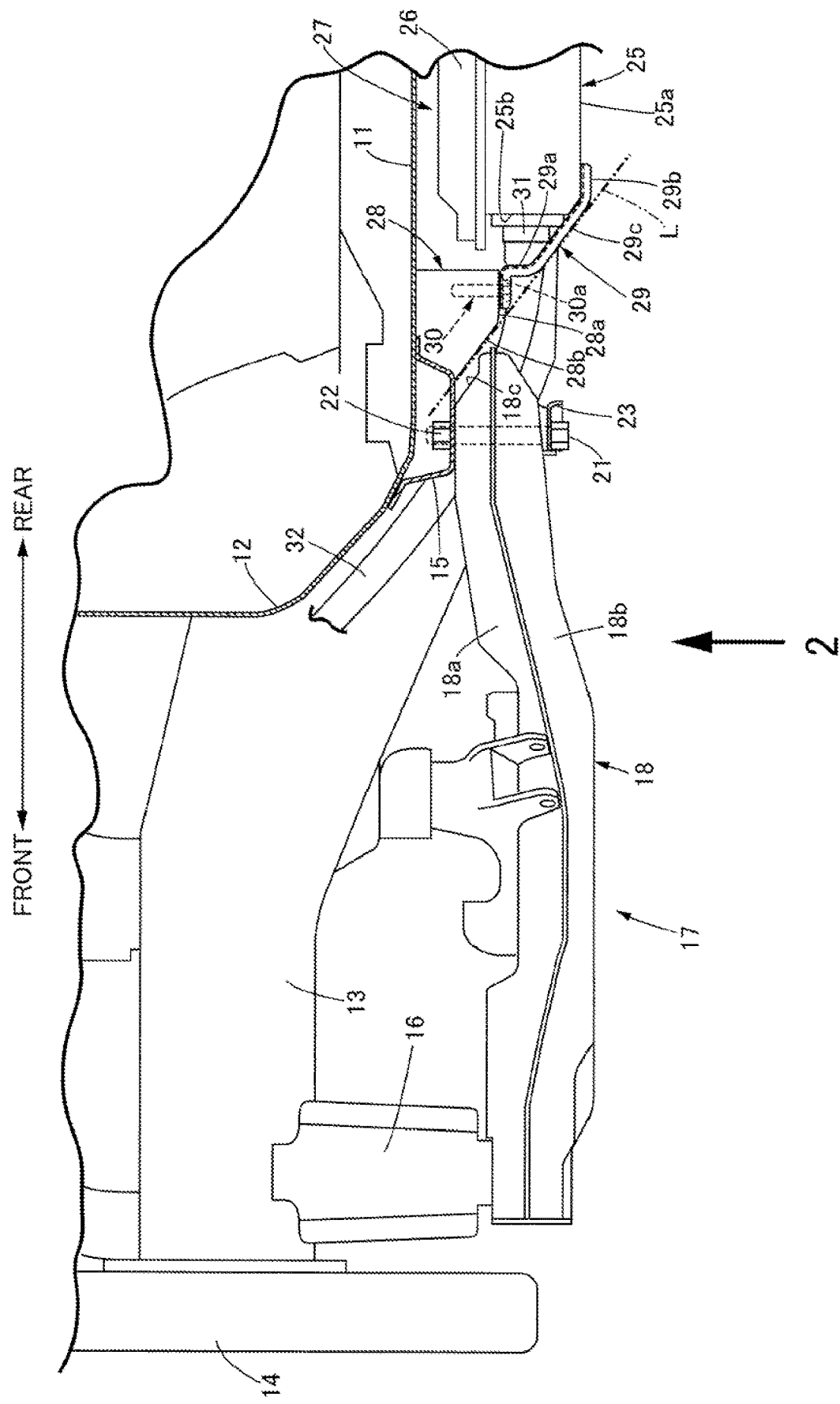
FIG. 1 is a longitudinal sectional view of a vehicle body front part of an electric vehicle (first embodiment).
Figure 2:
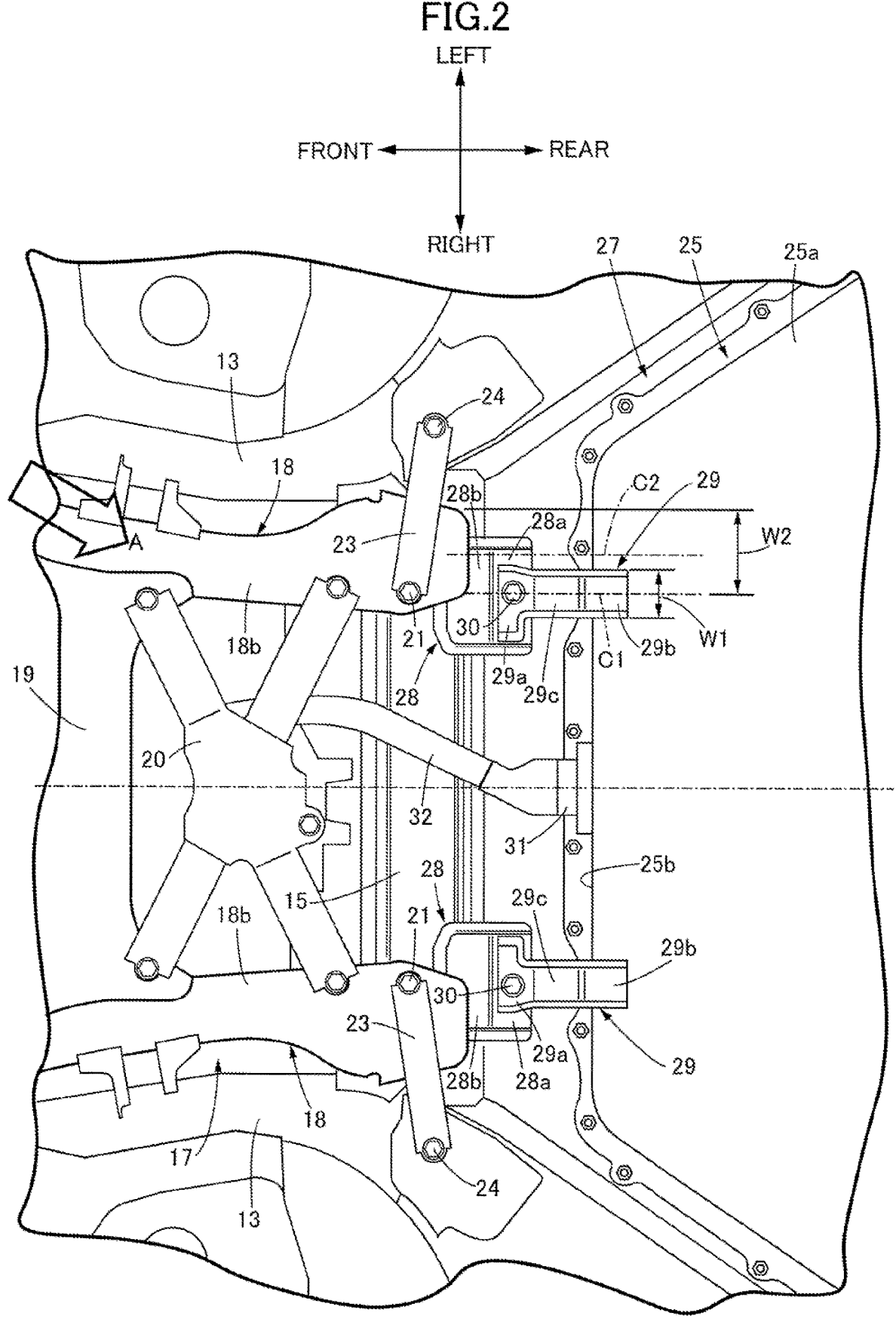
FIG. 2 is a view in the direction of arrow 2 in FIG. 1 (first embodiment).
Figure 3:
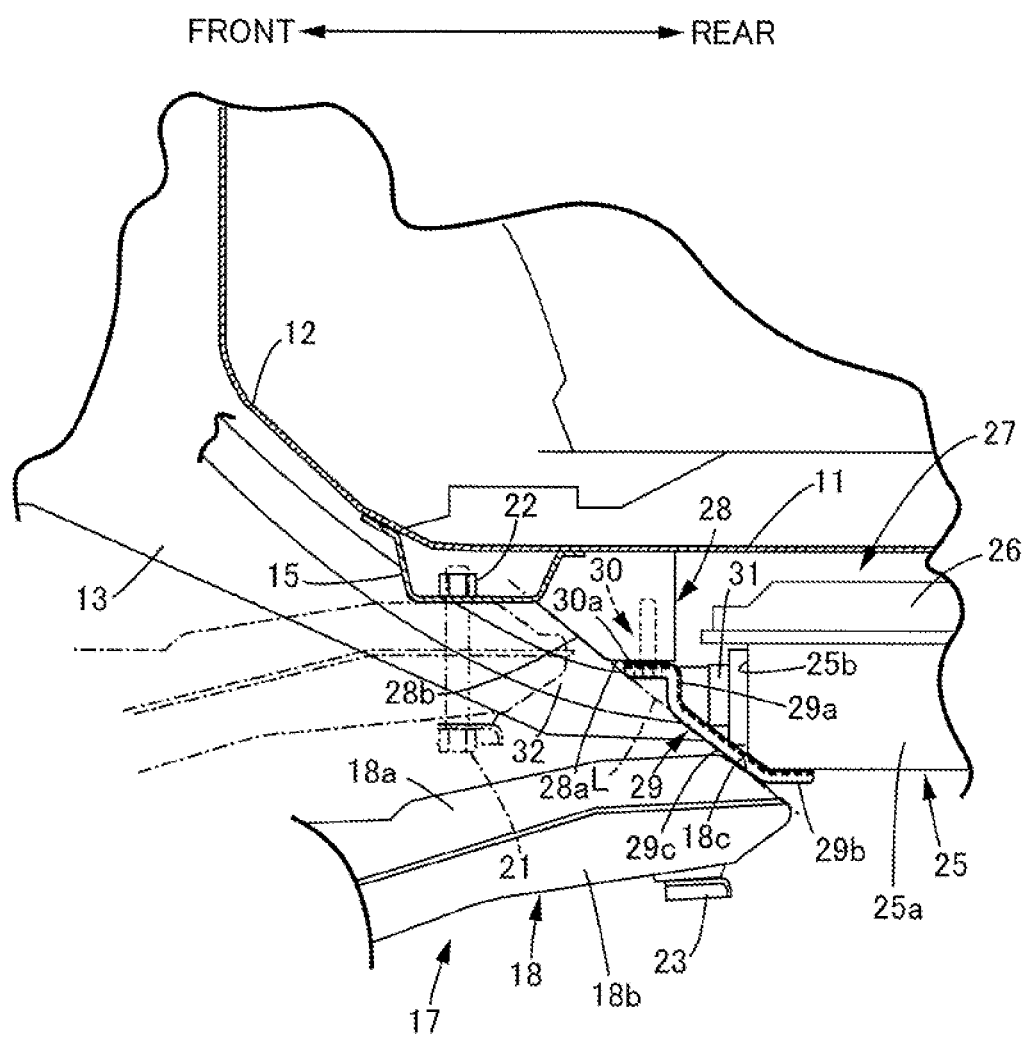
FIG. 3 is an operation explanatory view when involved in a frontal collision (first embodiment).

As shown in FIG. 1 and FIG. 2, a vehicle body front part of an electric vehicle includes a dash panel lower 12 rising upward from the front end of a vehicle body floor 11, and a rectangular frame-shaped front bulkhead 14 is connected to front ends of a pair of left and right front side frames 13 extending forward from a front part of the vehicle body floor 11 and a lower part of the dash panel lower 12. A front cross member 15 extending in the vehicle width direction is provided on a lower face of the front part of the vehicle body floor 11, a pair of left and right support members 16 extending downward are provided on front parts of the left and right front side frames 13, and a front subframe 17 is suspended on a lower face of the front cross member 15 and the lower ends of the left and right support members 16, the front subframe 17 supporting a steering device, a suspension system of a front wheel, a compressor for air conditioning, etc.

The front subframe 17 includes a pair of left and right longitudinal frames 18 extending in the fore-and-aft direction, a cross member 19 providing a link in the vehicle width direction between middle parts in the fore-and-aft direction of the left and right longitudinal frames 18, and an X-shaped reinforcing member 20 providing a link between the left and right longitudinal frames 18 to the rear of the cross member 19. Rear parts of the left and right longitudinal frames 18 of the front subframe 17 are fastened by screwing two bolts 21, extending through the rear parts from bottom to top, into two nuts 22 provided in the interior of the front cross member 15 and, furthermore, one ends of a pair of left and right stays 23 are fastened together by the bolts 21 and other ends of the stays 23 are fastened to the rear ends of the left and right front side frames 13 by two bolts 24.

A battery pack 27 that includes a case 25 and a cover 26 and that houses a battery for traveling is mounted on a lower face of the vehicle body floor 11. A pair of left and right battery pack support parts 28, which are reinforcing parts of the vehicle body floor 11, are downwardly projectingly provided so as to be in contact with a rear face of the front cross member 15, and the case 25 of the battery pack 27 is suspendingly supported on the battery pack support parts 28 via a pair of left and right brackets 29. Each bracket 29 includes an upper mounting portion 29a, a lower mounting portion 29b, and a guide portion 29c providing a connection between the upper mounting portion 29a and the lower mounting portion 29b.

The upper mounting portion 29a of each bracket 29 is bent into an L shape and is fastened to a bottom wall 28a of the battery pack support part 28 by a bolt 30 extending through an upper part of the upper mounting portion 29a from bottom to top. The lower mounting portion 29b of the bracket 29 extends rearward from the lower end of the guide portion 29c and is welded to a bottom wall 25a of the case 25 of the battery pack 27. The guide portion 29c of the bracket 29 is inclined upward to the front in going from the lower mounting portion 29b toward the upper mounting portion 29a, and the upper mounting portion 29a, a head portion 30a of the bolt 30, and the lower mounting portion 29b are positioned to the rear with respect to an imaginary inclined line L that is an extension of the guide portion 29c in the fore-and-aft direction. A guide wall 28b extending so as to be inclined upward to the front from the bottom wall 28a of the battery pack support part 28 is also positioned on the imaginary inclined line L.

On the other hand, each longitudinal frame 18 of the front subframe 17 is a hollow closed section member formed by joining an upper member 18a and a lower member 18b via an outer peripheral flange, and a guide wall 18c parallel to the imaginary inclined line L is formed at the rear end of the upper member 18a facing the front of the guide wall 28b of the battery pack support part 28 and the guide portion 29c of the bracket 29. A high voltage cable 32 is led out from a high voltage terminal 31 provided on a front wall 25b of the case 25 of the battery pack 27 toward a junction board (not illustrated) disposed above the front side frames 13.

As is clear from FIG. 2, a dimension W1 in the vehicle width direction of the bracket 29 is smaller than a dimension W2 in the vehicle width direction of a rear end part of the longitudinal frame 18, but a center C2 in the vehicle width direction of the rear end part of the longitudinal frame 18 is offset outward in the vehicle width direction with respect to a center C1 in the vehicle width direction of the bracket 29.

The operation of the embodiment of the present invention having the above arrangement is now explained.

When the vehicle is involved in a frontal collision and the front subframe 17 moves rearward with respect to the front side frames 13, the guide walls 18c at the rear ends of the left and right longitudinal frames 18 of the front subframe 17 abut against the guide walls 28b of the battery pack support parts 28 and the guide portions 29c of the brackets 29. Since the guide walls 18c of the front subframe 17 are inclined downward from the upper front to the rear along the imaginary inclined line L, and the guide walls 28b of the battery pack support parts 28 and the guide portions 29c of the brackets 29 are also inclined downward from the upper front to the rear along the imaginary inclined line L, as shown in FIG. 3 the rear end part of the front subframe 17 slips downward along the imaginary inclined line L, the battery pack support parts 28 are broken, and the bolts 21 drop off.

As a result, the front subframe 17 moves rearward while crumpling in the fore-and-aft direction and in the end stage of the collision the rear end part of the front subframe 17 drops downward without interfering with the front end part of the battery pack 27; not only is it possible to prevent the battery pack 27 from being damaged due to collision with the front subframe 17, but it is also possible to ensure the crash stroke of the vehicle body front part due to rearward movement of the front subframe 17, thus enhancing the effect in absorbing collision energy. As described above, since the abutment relationship with the guide walls 18c of the longitudinal frames 18 of the front subframe 17 can be adjusted merely utilizing the brackets 29 for fixing the battery pack 27 to the vehicle body and changing the angle of inclination or the position of the brackets 29 without subjecting the shape itself of the battery pack 27 to a change in design, the cost is very low.

Moreover, since the center C2 in the vehicle width direction of the rear end parts of the longitudinal frames 18 is offset outward in the vehicle width direction with respect to the center C1 in the vehicle width direction of the brackets 29, even when the vehicle is involved in an oblique collision from the direction of arrow A of FIG. 2 and the rear end parts of the longitudinal frames 18 of the front subframe 17 move obliquely rearward and inward in the vehicle width direction, it is possible to reliably make the rear end parts of the longitudinal frames 18 abut against the brackets 29.

Furthermore, although the front parts of the brackets 29 are fixed to the battery pack support parts 28 by the bolts 30, since the upper mounting portions 29a of the brackets 29 are bent rearward so that the head portions 30a of the bolts 30 are positioned rearwardly of the imaginary inclined line L, the rear end part of the front subframe 17, which moves rearward due to a frontal collision, does not interfere with the head portions 30a of the bolts 30, the front subframe 17 moves smoothly rearward, and the brackets 29 can reliably drop off.

Moreover, since the high voltage terminal 31 of the battery pack 27 is positioned between the two brackets 29 adjacent to each other in the vehicle width direction, the high voltage terminal 31 of the battery pack 27 can be protected by the two brackets 29 from an impact from the outside in the vehicle width direction.

Second Embodiment

Figure 4:
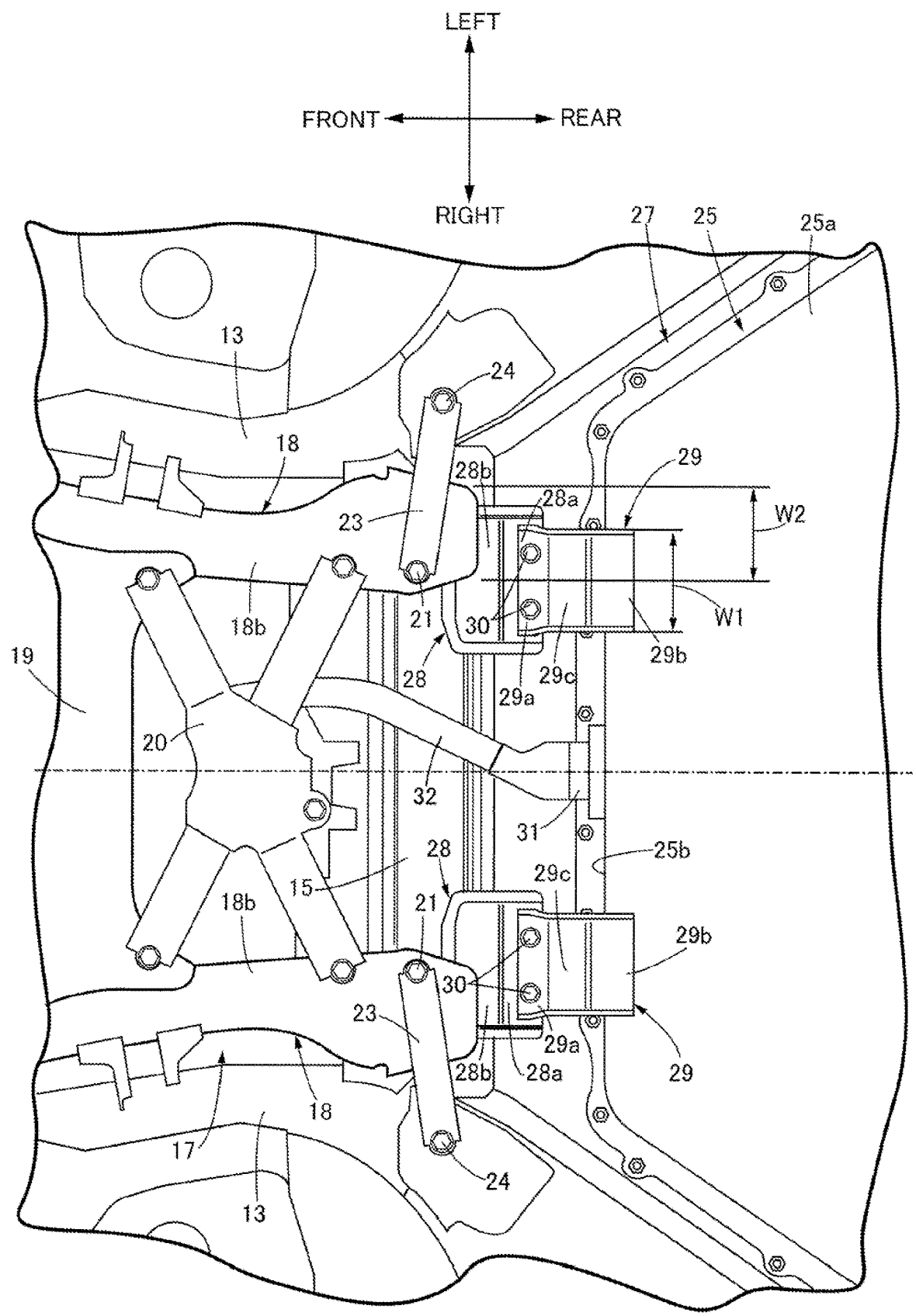
FIG. 4 is a view corresponding to FIG. 2 (second embodiment).

A second embodiment of the present invention is now explained by reference to FIG. 4.

In the first embodiment, the dimension W2 in the vehicle width direction of the rear end parts of the longitudinal frames 18 of the front subframe 17 is set larger than the dimension W1 in the vehicle width direction of the brackets 29; in the second embodiment the dimension W1 in the vehicle width direction of the brackets 29 is set larger than the dimension W2 in the vehicle width direction of the rear end parts of the longitudinal frames 18 of the front subframe 17. This enables the rear end parts of the longitudinal frames 18 of the front subframe 17 to be more reliably abutted against the brackets 29 even when the front subframe 17 moves rearward in various directions due to a frontal collision.

Embodiments of the present invention are explained above, but the present invention may be modified in a variety of ways as long as the modifications do not depart from the gist of the present invention.

For example, in the embodiments the guide walls 18c at the rear end of the longitudinal frames 18 of the front subframe 17 can abut against the guide walls 28b of the battery pack support parts 28 and the guide portions 29c of the brackets 29, but the guide walls 28b of the battery pack support parts 28 are not always necessary and can be omitted.

Furthermore, in the embodiments the guide walls 18c are provided on the rear end parts of the longitudinal frames 18 of the front subframe 17, but the guide walls 18c are not always necessary as long as the rear end parts of the longitudinal frames 18 can abut against the guide portions 29c of the brackets 29.

Moreover, the vehicle body frame of the present invention is not limited to the longitudinal frames 18 of the front subframe 17 of the embodiments.

What is claimed is:

1. A vehicle body front structure for an electric vehicle, comprising
    a battery pack mounted beneath a vehicle body floor,
    a bracket having a rear part and a front part thereof, the rear part being fixed to the battery pack and the front part being fixed to the vehicle body floor, and
    a vehicle body frame disposed in a fore-and-aft direction in front of the vehicle body floor,
    wherein the vehicle body frame comprises a longitudinal frame longitudinally extending in the fore-and-aft direction, a longitudinal rear end part of the longitudinal frame being inclined downward from an upper front to a rear to have a frame inclined surface,
    the bracket is inclined downward from the upper front to the rear to have a bracket inclined surface,
    when viewed in the fore-and-aft direction, at least part of the bracket overlaps the longitudinal rear end part of the vehicle body frame, and
    wherein a center in a vehicle width direction of the longitudinal rear end part of the vehicle body frame is offset outside in the vehicle width direction with respect to a center in the vehicle width direction of the bracket.

2. The vehicle body front structure for an electric vehicle according to claim 1, wherein a dimension in a vehicle width direction of the bracket is larger than a dimension in the vehicle width direction of the longitudinal rear end part of the vehicle body frame.

3. The vehicle body front structure for an electric vehicle according to claim 2, wherein
    there are a plurality of vehicle body frames as said vehicle body frame and a plurality of brackets as said bracket, and
    a high voltage terminal of the battery pack is positioned between two of the brackets that are adjacent to each other in the vehicle width direction.

4. The vehicle body front structure for an electric vehicle according to claim 2, wherein
    the front part of the bracket is fixed to the vehicle body floor by a bolt and bent rearward so that a head portion of the bolt is positioned rearwardly of an imaginary inclined line of the bracket which is an extension line of the bracket inclined surface.

5. The vehicle body front structure for an electric vehicle according to claim 1, wherein
    there are a plurality of vehicle body frames as said vehicle body frame and a plurality of brackets as said bracket, and
    a high voltage terminal of the battery pack is positioned between two of the brackets that are adjacent to each other in a vehicle width direction.

6. The vehicle body front structure for an electric vehicle according to claim 1, wherein
 the front part of the bracket is fixed to the vehicle body floor by a bolt and bent rearward so that a head portion of the bolt is positioned rearwardly of an imaginary inclined line of the bracket which is an extension line of the bracket inclined surface.

7. The vehicle body front structure for an electric vehicle according to claim 1, wherein the frame inclined surface is parallel to the bracket inclined surface.

\* \* \* \* \*